US010165246B2

(12) United States Patent
Buerkle et al.

(10) Patent No.: US 10,165,246 B2
(45) Date of Patent: Dec. 25, 2018

(54) METHOD AND DEVICE FOR PROCESSING STEREOSCOPIC DATA

(71) Applicant: Robert Bosch GmbH, Stuttgart (DE)

(72) Inventors: Lutz Buerkle, Stuttgart (DE); Oliver Pink, Abstatt (DE)

(73) Assignee: Robert Bosch GmbH, Stuttgart (DE)

(*) Notice: Subject to any disclaimer, the term of this patent is extended or adjusted under 35 U.S.C. 154(b) by 164 days.

(21) Appl. No.: 14/404,799

(22) PCT Filed: Apr. 24, 2013

(86) PCT No.: PCT/EP2013/058476
§ 371 (c)(1),
(2) Date: Dec. 1, 2014

(87) PCT Pub. No.: WO2013/178407
PCT Pub. Date: Dec. 5, 2013

(65) Prior Publication Data
US 2015/0156471 A1 Jun. 4, 2015

(30) Foreign Application Priority Data

Jun. 1, 2012 (DE) .................. 10 2012 209 316

(51) Int. Cl.
*H04N 13/128* (2018.01)
*G06K 9/00* (2006.01)
(Continued)

(52) U.S. Cl.
CPC ........... *H04N 13/128* (2018.05); *B60R 1/002* (2013.01); *G06K 9/00805* (2013.01);
(Continued)

(58) Field of Classification Search
CPC ............... H04N 13/128; H04N 13/239; H04N 2013/0081
See application file for complete search history.

(56) References Cited

U.S. PATENT DOCUMENTS

2004/0258279 A1* 12/2004 Hirvonen ........... G06K 9/00201
382/104
2005/0100192 A1* 5/2005 Fujimura ........... G06K 9/00369
382/103
(Continued)

FOREIGN PATENT DOCUMENTS

CN 101701818 A 5/2010
CN 101701828 A 5/2010
(Continued)

OTHER PUBLICATIONS

International Search Report for PCT/EP2013/058476, dated Jul. 26, 2013.

(Continued)

*Primary Examiner* — Hung Q Dang
*Assistant Examiner* — Sunghyoun Park
(74) *Attorney, Agent, or Firm* — Norton Rose Fulbright US LLP; Gerard Messina

(57) ABSTRACT

A method is described for processing sensor data of a stereo sensor system for stereoscopic sensing of an environment of the stereo sensor system. A disparity map is constituted based on the sensor data, wherein a change in disparity between two disparity points of the disparity map that are constituted with a spacing from one another is identified, at least one of the two disparity points being classified to correspond to an object as a function of the change in disparity. Also described is a corresponding apparatus, to a corresponding object recognition system, and to a corresponding computer program.

17 Claims, 3 Drawing Sheets

(51) Int. Cl.
  *B60R 1/00* (2006.01)
  *H04N 13/239* (2018.01)
  *H04N 13/00* (2018.01)

(52) U.S. Cl.
  CPC ...... *H04N 13/239* (2018.05); *B60R 2300/105* (2013.01); *B60R 2300/107* (2013.01); *B60R 2300/303* (2013.01); *B60R 2300/8093* (2013.01); *H04N 2013/0081* (2013.01)

(56) References Cited

U.S. PATENT DOCUMENTS

| | | | |
|---|---|---|---|
| 2005/0286758 A1* | 12/2005 | Zitnick, III | G06K 9/20 382/154 |
| 2006/0056727 A1* | 3/2006 | Jones | G06K 9/32 382/276 |
| 2006/0082575 A1* | 4/2006 | Auberger | H04N 19/597 345/421 |
| 2007/0075997 A1* | 4/2007 | Rohaly | G06T 7/593 345/419 |
| 2009/0022222 A1* | 1/2009 | He | H04N 19/597 375/240.12 |
| 2009/0022393 A1* | 1/2009 | Bar-Zohar | G06T 7/593 382/154 |
| 2009/0141938 A1* | 6/2009 | Lim | G06K 9/00664 382/103 |
| 2010/0039502 A1* | 2/2010 | Robinson | G06T 15/20 348/47 |
| 2010/0119114 A1* | 5/2010 | Ardis | G06K 9/20 382/106 |
| 2010/0158387 A1* | 6/2010 | Choi | G06K 9/00228 382/195 |
| 2010/0215249 A1* | 8/2010 | Heitz | G06T 7/0075 382/154 |
| 2011/0032341 A1* | 2/2011 | Ignatov | H04N 13/0033 348/51 |
| 2011/0044531 A1* | 2/2011 | Zhang | H04N 13/0022 382/154 |
| 2011/0050853 A1* | 3/2011 | Zhang | H04N 13/026 348/44 |
| 2012/0026332 A1* | 2/2012 | Hammarstrom | G06T 7/593 348/148 |
| 2012/0098933 A1* | 4/2012 | Robinson | H04N 13/0018 348/46 |
| 2012/0162374 A1* | 6/2012 | Markas | H04N 13/221 348/46 |
| 2012/0182419 A1* | 7/2012 | Wietfeld | B25J 9/1676 348/137 |
| 2012/0269382 A1* | 10/2012 | Kiyohara | G01C 21/26 382/103 |
| 2013/0010093 A1* | 1/2013 | Redmann | H04N 13/0018 348/61 |
| 2013/0057658 A1* | 3/2013 | Allezard | G06K 9/00798 348/47 |
| 2013/0063560 A1* | 3/2013 | Roberts | G06F 3/011 348/46 |
| 2013/0129148 A1* | 5/2013 | Nanri | G01C 21/3602 382/103 |
| 2013/0156295 A1* | 6/2013 | Kerbiriou | G06K 9/00201 382/154 |
| 2013/0215220 A1* | 8/2013 | Wang | H04N 13/021 348/43 |

FOREIGN PATENT DOCUMENTS

| | | |
|---|---|---|
| CN | 101999972 A | 4/2011 |
| CN | 102313536 A | 1/2012 |
| CN | 102390370 A | 3/2012 |
| DE | 102009003110 | 11/2010 |
| EP | 2136333 | 12/2009 |
| WO | WO/2009/131210 | * 10/2009 |

OTHER PUBLICATIONS

Brendan M. Collins et al., "Stereo Vision for Obstacle Detection in Autonomous Navigation", DARPA Grand Challenge Princeton University Technical Paper, 2006, pp. 1-35.

Gong K et al., "Ground-plane detection using stereo depth values for wheelchair guidance", Image and Vision Computing New Zealand, 24th International Conference, 2009, pp. 97-101.

Chung-Hee Lee. "Stereo vision-based vehicle detection using a road feature and disparity histogram", Optical Engineering, vol. 50, No. 2, 2011, pp. 027004-1-23.

Boon Kiat Quck et al., "Feature detection for stereo-vision-based unmanned navigation", Cybernetics and Intelligent Systems, 2004, Conference on Singapore, vol. 1, 2004, pp. 141-146.

Einramhof P et al., "Stereo-based real-time scene segmentation for a home robot", ELMAR, 2010 Proceedings, 2010, pp. 455-458.

David Pfeiffer et al., "Efficient representation of traffic scenes by means of dynamic stixels", Intelligent Vehicles Symposium (IV), 2010, 2010, pp. 217-224.

David Pfeiffer et al., "Modeling Dynamic 3D Environments by Means of The Stixel World", Intelligent Transportation Systems Magazine, vol. 3, No. 3, 2011, pp. 24-36.

Nuria Ortigosa et al., "0bstacle-Free Pathway Detection by Means of Depth Maps", Journal of Intelligent and Robotic Systems, Theory and Applications—(Incorporating Mechatronic Systems Engineering), vol. 63, No. 1, 2010, pp. 115-129.

Herna A N Badino et al., "The Stixel World—A Compact Medium Level Representation of the 3D-World," Pattern Recognition : 31st DAGM Symposium, 2009, Proceedings; Lecture Notes in Computer Science; pp. 51-60.

Yu Song et al., "Detecting objects in complex urban area using depth information", Information Theory and Information Security (ICITIS), International Conference On, 2010, pp. 1111-1114.

Zayed M et al., "0bstacles detection from disparity properties in a particular stereo vision system configuration", Intelligent Transportation Systems, Proceedings, 2003, vol. 1, 2003, pp. 311-316.

Anand R. Atreya et al.,"Prospect Eleven: Princeton University's entry in the 2005 DARPA Grand Challenge", Journal of Field Robotics, vol. 23, No. 9, 2006, pp. 745-753.

* cited by examiner

METHOD AND DEVICE FOR PROCESSING STEREOSCOPIC DATA

FIELD OF THE INVENTION

The present invention relates to a method and an apparatus for processing or manipulating sensor data of a stereo sensor system for stereoscopic sensing of an environment of the stereo sensor system. The invention further relates to an object recognition system and to a computer program.

BACKGROUND INFORMATION

Driver assistance systems as a rule require sensors in order to sense obstacles and identify an open area in the vehicle's surroundings. Stereo cameras that encompass two horizontally offset cameras are used, inter alia, for this. The result of this disposition is that objects are observed in horizontally offset fashion in the camera images as well; the offset, or so-called "disparity," becomes smaller for remote objects and larger for objects in the close-in region, with reference to the cameras. For each object, its distance from the observer (i.e. in this case the stereo camera) can consequently be identified from the disparity.

German Published Patent Application No. 2009 003 110 discloses a method for identifying the disparities of the two camera images (the so-called "disparity map").

European Published Patent Application No. 2 136 333 discloses a method for identifying a travelable region and for recognizing obstacles from the disparity map.

SUMMARY

An object on which the invention is based can be seen as that of furnishing a method that enables simple classification of objects of a surroundings of a stereo sensor system.

The object on which the invention is based can also be seen as that of furnishing a corresponding apparatus.

The object on which the invention is based can also be seen as that of furnishing a corresponding object recognition system.

The object on which the invention is based can also be seen as that of describing a corresponding computer program.

According to one aspect, a method for processing or manipulating sensor data of a stereo sensor system for stereoscopic sensing of an environment of the stereo sensor system is furnished. Based on the sensor data of the stereo sensor system, a disparity map is constituted. Provision is made that a change in disparity between two disparity points of the disparity map that are constituted with a spacing from one another is identified, at least one of the two disparity points being classified to correspond to an object as a function of the change in disparity.

According to a further aspect, an apparatus for processing or manipulating sensor data of a stereo sensor system for stereoscopic sensing of an environment of the stereo sensor system is furnished. The apparatus encompasses a disparity device for constituting a disparity map based on the sensor data of the stereo sensor system. Also provided is an identification device for identifying a change in disparity between two disparity points of the disparity map that are constituted with a spacing from one another. The apparatus furthermore encompasses a classification device for classifying at least one of the two disparity points to correspond to an object as a function of the change in disparity.

According to yet another aspect, an object recognition system is furnished which encompasses a stereo sensor system for stereoscopic sensing of an environment of the stereo sensor system and an apparatus for processing or manipulating sensor data of a stereo sensor system for stereoscopic sensing of an environment of the stereo sensor system.

According to yet another aspect, a computer program is furnished which encompasses program code for executing the method for processing or manipulating sensor data of a stereo sensor system for stereoscopic sensing of an environment of the stereo sensor system when the computer program is executed in a computer.

Because provision is made that the disparity map is evaluated in such a way that a difference between a first disparity value and a second disparity value of the disparity map is identified as the change in disparity between two disparity points of the disparity map, the advantageous result is that no assumptions need to be made regarding an environment of the stereo sensor system in order to classify at least one of the two disparity points to correspond to an object.

As a rule, it is the case in the existing art that assumptions regarding the environment must be made so that objects can be recognized or classified based on the disparity map. If the stereo sensor system is used in a vehicle, for example, it is usual to utilize the assumption that a travelable area in the environment of the vehicle is approximated by a plane. Obstacles are notable here for a height appreciably deviating from a roadway plane. This requires a prior identification of the roadway plane, however, for example via a row-wise histogram of the disparity map (called the "V disparity"). If errors occur in the estimation of the plane, however, the direct result is generally that objects are incorrectly detected or not detected.

The assumption of a plane surface in the vehicle environment is moreover, in practice or in reality, as a rule justified or correct only for very short distances.

The advantageous result of the fact that an assumption as to planes need not be carried out for the environment of the stereo sensor system is thus that a corresponding calculation outlay can be reduced. In particular, it is thus no longer necessary to create a row-wise histogram of the disparity map. This, too, reduces a calculation outlay. Less energy as compared with the existing art is therefore required for a corresponding calculation. In addition, calculation time can advantageously be saved. This results in particular in faster reactions by driver assistance systems that encompass embodiments according to the present invention, since a result as to whether the object that is recognized is an obstacle or a travelable area is available more quickly. This advantageously also increases safety, both for the vehicle and vehicle occupants and for other traffic participants such as pedestrians.

In addition, errors as a result of estimates or assumptions inherently can no longer occur, since such estimates or assumptions are no longer necessary and are also no longer used. A model of a roadway surface does not need to be constituted. In particular, a dependence no longer exists on a profile of a point plane referred to the roadway surface. This results in particular in appreciably enhanced robustness and reliability in practice.

Greater distance ranges in terms of the stereo sensor system can moreover be reliably analyzed for objects, which are then correspondingly classified.

The invention furthermore has the advantage that it exhibits substantially no size dependence on objects in the environment. The objects should merely have a minimum height.

A "stereo sensor system" for purposes of the present invention is embodied in particular to sense an environment of the stereo sensor system stereoscopically. This therefore means in particular that two sensor images of the environment are constituted, the two sensor images being acquired from mutually horizontally offset perspectives. As already mentioned, this leads to an offset of objects in the two sensor images. The sensor data of the stereo sensor system correspond to the two sensor images.

"Disparity" for purposes of the present invention therefore refers in particular to the offset that results between an image point of the first sensor image and the corresponding image point of the second sensor image. The image points correspond here to world points that are allocated to a real object in the environment of the stereo sensor system. The image points thus result from an imaging of the world points onto one or more sensors of the stereo sensor system. These sensors are embodied in particular to sense the environment sensorially. Infrared sensors, for example, which advantageously can still sense the environment even in darkness, can be provided. Each image point and/or each disparity has a unique relationship to a respective distance of the world point from the stereo sensor system. The farther away in the environment an object is located in terms of the stereo sensor system, the smaller the corresponding disparity compared with an object that is located closer to the stereo sensor system. For each object, its distance from the stereo sensor system can therefore be identified from the disparity.

In general, the image points of the sensor images can be described by X, Y coordinates, also referred to as "image coordinates," of a Cartesian coordinate system. A sensor image row, also referred to as an "image row" or simply "row," is defined in the direction of the abscissa (here the X axis) of the coordinate system. A sensor image column, also referred to as an "image column" or simply "column," is defined in the direction of the ordinate (here the Y axis) of the coordinate system.

The disparity can hereinafter also be abbreviated "d". A set of all disparities d(X, Y) of two sensor images constitutes the disparity map.

According to an embodiment, provision can be made that the stereo sensor system is constituted as a stereo video camera. This therefore means that two video cameras disposed with a mutual horizontal offset are constituted.

In this embodiment, the disparity can be referred to a focal length of the camera and can be obtained in particular as the quotient of the offset of the image points corresponding to a world point, expressed in image coordinates X, Y, and the focal length of the camera. The disparity is preferably reciprocal to the distance of the world point from a reference site such as a reference point, a reference area, or a reference surface of the stereo video camera, and can be indicated, in consideration of a baseline width of the cameras from one another, i.e. the spacing of the cameras, approximately as the following ratio:

The quotient of the disparity and the camera focal length corresponds to the quotient of the baseline width and the distance of the world point.

The disparity d is thus defined in particular as a one-dimensional displacement vector in the direction of the image row and indicates, proceeding from an image point $X_i$ in the first sensor image, the corresponding image point $X_j$ in the second sensor image. Thus $d(X_i, Y) = X_j - X_i$.

A "change in disparity" for purposes of the present invention thus refers in particular to a difference between a first disparity value, also simply called "disparity," at a first image point (X1, Y1) and a second disparity value, also simply called "disparity," of a second image point having the coordinates (X2, Y2). The change in disparity can thus be described by the following mathematical formula:

$$h = d(X1, Y1) - d(X2, Y2).$$

The fact that the classification of the disparity points is carried out as a function of h (the change in disparity) means in particular that a predetermined threshold value, in particular multiple predetermined threshold values, are provided, the classification being carried out in particular as a function of whether h is greater than, equal to, less than, greater than or equal to, or less than or equal to the predetermined threshold value, preferably equal to the multiple predetermined threshold values. Provision can thus be made, for example, that if h is less than the threshold value, the disparity point is classified as a first object, for example an obstacle; and if h is greater than the threshold value, the disparity point is classified as a second object, for example a travelable area.

"Classifying" or "classification" for purposes of the present invention refers in particular to an assignment or allocation of the disparity points, or of the image points in the sensor images corresponding to said disparity points, to predetermined object classes or objects. One object class, for example, can be an obstacle. A further object class can be an open area or travelable area. This therefore means in particular that the individual image points of the sensor images are classified, for example, as to whether an obstacle or an open area or travelable area is involved.

Because the disparity points are based on the image points of the sensor images, which correspond to world points or to which world points are allocated, a real object in the environment of the stereo sensor system can thus advantageously be classified.

The spacing between two disparity points having the coordinates (X1, Y1) and (X2, Y2) can be referred to as $\Delta(\Delta X, \Delta Y)$, where $X2 = X1 + \Delta X$ and $Y2 = Y1 + \Delta Y$. $\Delta X$ refers to the horizontal spacing, i.e. in the X direction, between the two disparity points. $\Delta Y$ refers to the vertical spacing, i.e. in the Y direction, between the two disparity points.

According to an embodiment, provision can be made that the spacing $\Delta$ between the two disparity points is selected as a function of a position of one of the two disparity points in the disparity map. This advantageously makes possible a sensitivity adjustment in terms of classification. With a suitable selected spacing, even smaller objects can thus be detected as obstacles.

According to a further embodiment the spacing $\Delta$ between the two disparity points is selected as a function of a disparity noise, in particular of an expected disparity noise. This likewise advantageously makes possible a sensitivity adjustment in terms of classification, so that regions of the disparity map which are individually differently noisy can be accounted for.

In another embodiment provision can be made that the spacing between the two disparity points is selected as a function of a height of an expected object, in particular of an obstacle, to be expected.

In another embodiment provision can be made that the spacing is selected differently for each disparity point of the disparity map. A sensitivity with regard to detection and classifying or classification can thereby advantageously be effected.

According to another embodiment provision can be made that the spacing is selected to be constant for all disparity points of the disparity map. A calculation outlay is thereby advantageously reduced even further.

In accordance with another embodiment, provision can be made that the disparity map is smoothed in a horizontal and/or vertical direction, i.e. in a column direction and/or row direction. Observation noise of the disparity map is thereby advantageously suppressed, resulting in an improved signal-to-noise ratio.

In a further embodiment provision can be made that the two disparity points are selected as two disparity points of the disparity map that are disposed with an exclusively vertical mutual offset. This therefore means that $\Delta X=0$. The two disparity points are thus disposed with only a vertical mutual offset, not also a horizontal mutual offset. A vertical evaluation with regard to a change in disparity in a column direction therefore preferably takes place. The disparity map is thus evaluated in particular column-wise. The change in disparity in a vertical direction is considered.

According to another embodiment provision can be made that in the context of a negative change in disparity, the disparity point is classified as an object that can be traveled under if the second disparity point is constituted above the first disparity point. Bridges or similar objects that can be traveled under can thus advantageously be recognized. The points corresponding to the bridge thus exhibit a greater disparity than the points below the bridge. A change in disparity will thus be negative.

In accordance with a further embodiment, the disparity device can be constituted as a disparity estimator that is embodied to carry out a disparity estimate based on the sensor data, and to constitute the disparity map based on the disparity estimate. A disparity map can thus be constituted quickly, efficiently, and without too much calculation outlay.

In another embodiment provision can be made that the identification of the change in disparity corresponds to an identification of a disparity gradient. This therefore means in particular that the change in disparity corresponds to a disparity gradient. Proceeding from the first disparity point, the second disparity point is therefore in particular identified in an environment of the first disparity point, in such a way that the corresponding change in disparity, which of course corresponds to a slope of the disparity map, is maximal. Described mathematically, a gradient at a point (here the first disparity point) of a scalar field (here the disparity map) is a vector that extends from the point in the direction of the maximum or steepest slope of the scalar field, a length of the gradient being an indication of the steepness or slope. Preferably a vertical disparity gradient is identified. This therefore means in particular that proceeding from the first disparity point, the second disparity point is identified in such a way that it has the same X coordinate but a different Y coordinate, the change in disparity being maximal with respect to the set of disparity points having the same Y coordinates. What is identified in particular is the proportion in the Y direction of the corresponding vector field with respect to the disparities.

DETAILED DESCRIPTION

Figure 1:
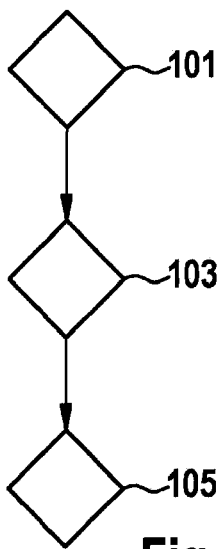
FIG. 1 is a flow chart of a method for operating sensor data of a stereo sensor system.

Identical reference characters can be used below for identical features.

FIG. 1 is a flow chart of a method for processing or manipulating sensor data of a stereo sensor system for stereoscopic sensing of an environment of the stereo sensor system.

In a step 101 a disparity map is constituted based on the sensor data of the stereo sensor system. In a step 103 a change in disparity between two disparity points of the disparity map which are constituted at a spacing from one another is identified. As a function of the change in disparity, at least one of the two disparity points is classified to correspond to an object according to a step 105. This therefore means in particular that an object allocated to the disparity point is classified. This therefore means, for example, that the object is classified as an obstacle or as an open area or a travelable area or as an object that can be traveled under, for example a bridge.

Figure 2:
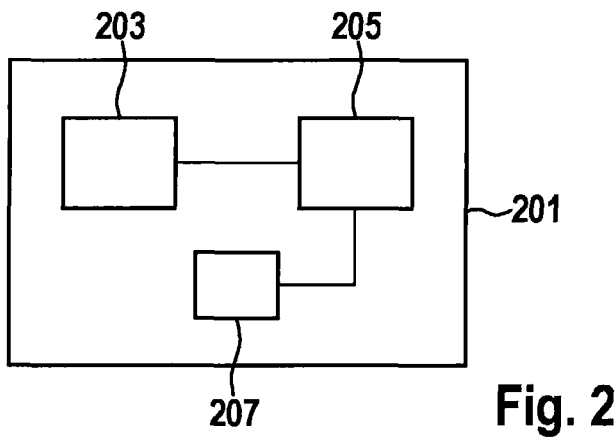
FIG. 2 shows an apparatus for processing or manipulating sensor data of a stereo sensor system.

FIG. 2 shows an apparatus 201 for processing or manipulating sensor data of a stereo sensor system (not shown) for stereoscopic sensing of an environment of the stereo sensor system.

Apparatus 201 encompasses a disparity device 203 for constituting a disparity map based on the sensor data that are furnished by way of the stereo sensor system. Disparity device 203 can preferably be constituted as a disparity estimator that is embodied to carry out a disparity estimate based on the sensor data and, on the basis thereof, to constitute the disparity map.

Apparatus 201 furthermore encompasses an identification device 205 for identifying a change in disparity between two disparity points of the disparity map that are disposed with a spacing from one another. Apparatus 201 furthermore encompasses a classification device 207 for classifying at least one of the two disparity points in correspondence with an object as a function of the change in disparity.

Figure 3:
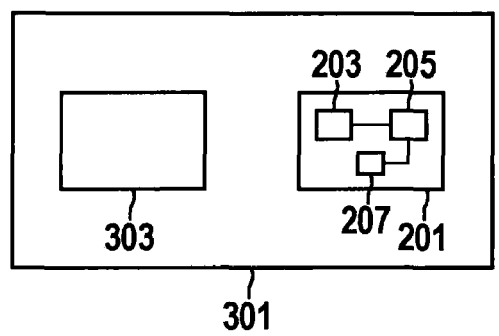
FIG. 3 shows an object recognition system.

FIG. 3 shows an object recognition system 301.

Object recognition system 301 encompasses a stereo sensor system 303 for stereoscopic sensing of an environment of a stereo sensor system, as well as apparatus 201 according to FIG. 2.

Figure 4:
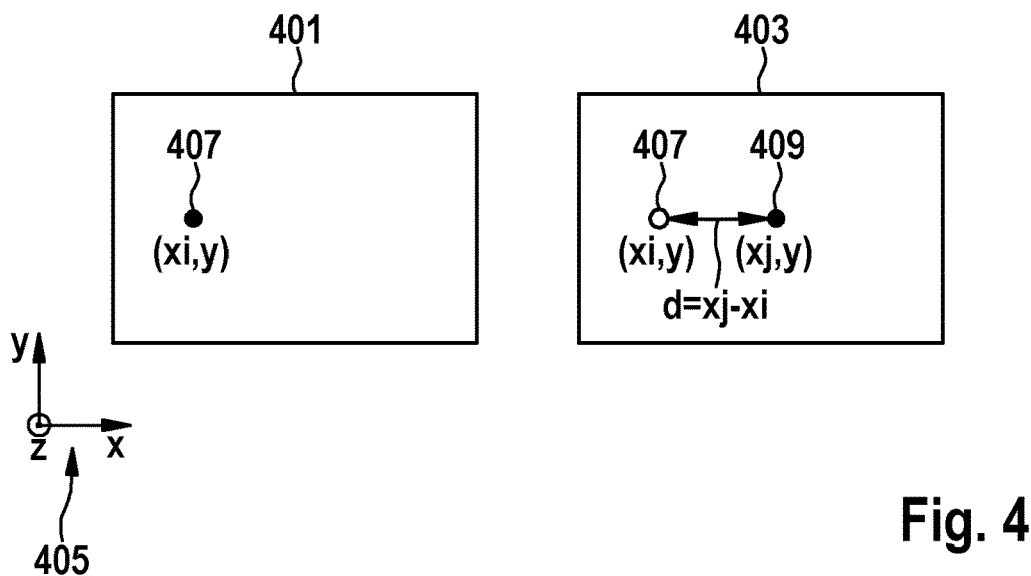
FIG. 4 shows two sensor images.

FIG. 4 shows two sensor images 401 and 403 that were constituted using a stereo sensor system. A Cartesian X,Y,Z coordinate system 405 is also depicted. An image point 407 having coordinates Xi, Y is furthermore depicted in sensor image 401 for illustration. The image point in sensor image 403 which corresponds to image point 407 is labeled in sensor image 403 with the reference character 409, and has the coordinates Xj, Y. The projected point 407 of sensor image 401 is also depicted as an open circle in sensor image 403.

The offset between the two points 407 and 409 is labeled as the disparity d. This therefore means in particular that the disparity $d=Xj-Xi$.

The set of all disparities, where $d(X, y)=Xj-Xi$, is referred to as a "disparity map."

The individual disparity values d are then plotted on the Z axis in the Cartesian coordinate system 405.

Figure 5:
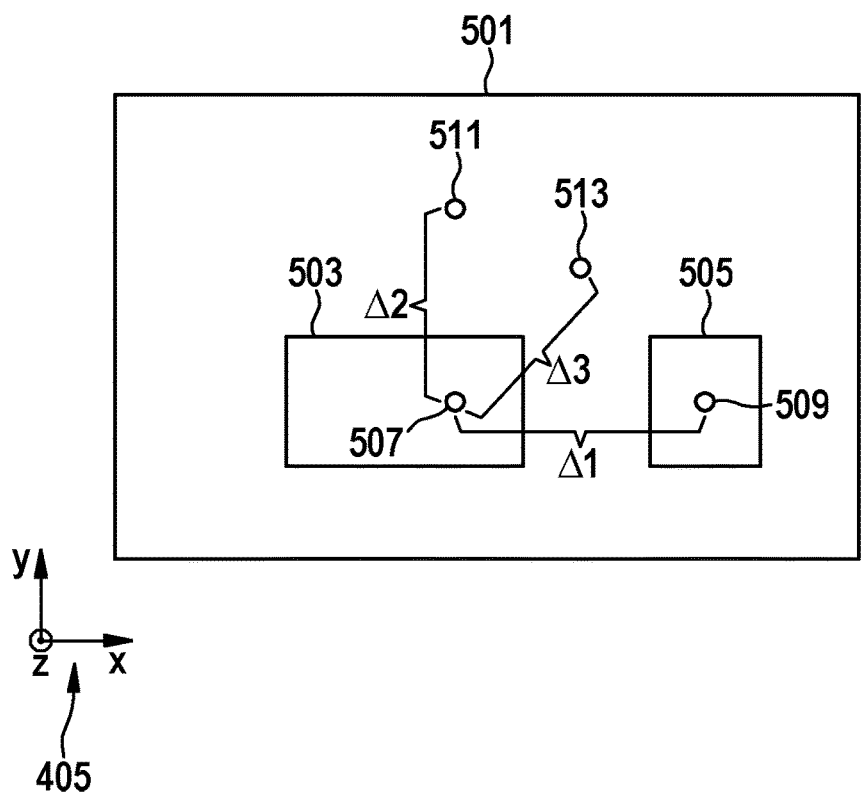
FIG. 5 shows a disparity map.

FIG. 5 shows a disparity map 501.

Two regions 503 and 509, which characterize regions having respectively different disparities, are depicted in disparity map 501; in the individual regions 503 and 509, the disparities are substantially constant or differ by only negligible amounts. For example, all the disparities d in region 505 can be smaller than the disparities in region 503. This therefore means in particular that the world points on which region 505 is based are located farther away than the world points on which region 503 is based. This therefore means in particular that the objects corresponding to those world points are located at different distances from the stereo sensor system. The objects corresponding to region 505 are thus located farther away, with reference to the stereo sensor system, than the objects corresponding to region 503.

Also depicted in disparity map 501 are three disparity points 507, 509, 511, and 513, disparity point 507 being located in region 503. Disparity point 509 is located in region 505. Disparity point 511 is located outside the two regions 503 and 505 and inside disparity map 501. Disparity point 513 is likewise disposed outside the two regions 503 and 505, but inside disparity map 501.

A spacing between the two disparity points 507 and 509 is labeled Δ1. A spacing between disparity point 507 and disparity point 511 is labeled Δ2. A spacing between disparity point 507 and disparity point 513 is labeled Δ3.

The two disparity points 507 and 505 have different X coordinates but the same Y coordinate. The two disparity points 507 and 511 have the same X coordinate but different Y coordinates. The two disparity points 507, 513 each have different X coordinates and Y coordinates.

The change in disparity between the two disparity points 507 and 511 can also be referred to as a "vertical" change in disparity. In this case disparity map 501 is evaluated column-wise. This therefore means in particular that the change in disparity in a column direction of disparity map 501 is used as an indicator for classification.

In this case the change in disparity h(X, Y) can be written as follows:

$$h(X,Y)=d(X,Y)-d(X,Y+\Delta 2),$$

where d denotes the disparity.

A predetermined threshold value is preferably provided; as a function of whether h(X, Y) is less than, less than or equal to, greater than, or greater than or equal to the predetermined threshold value, the corresponding disparity points, and thus indirectly the objects in the environment on which the disparity points are based, are classified, for example as an obstacle, as an open area or travelable area, or as an area that can be traveled under, for example a bridge.

Figure 6:
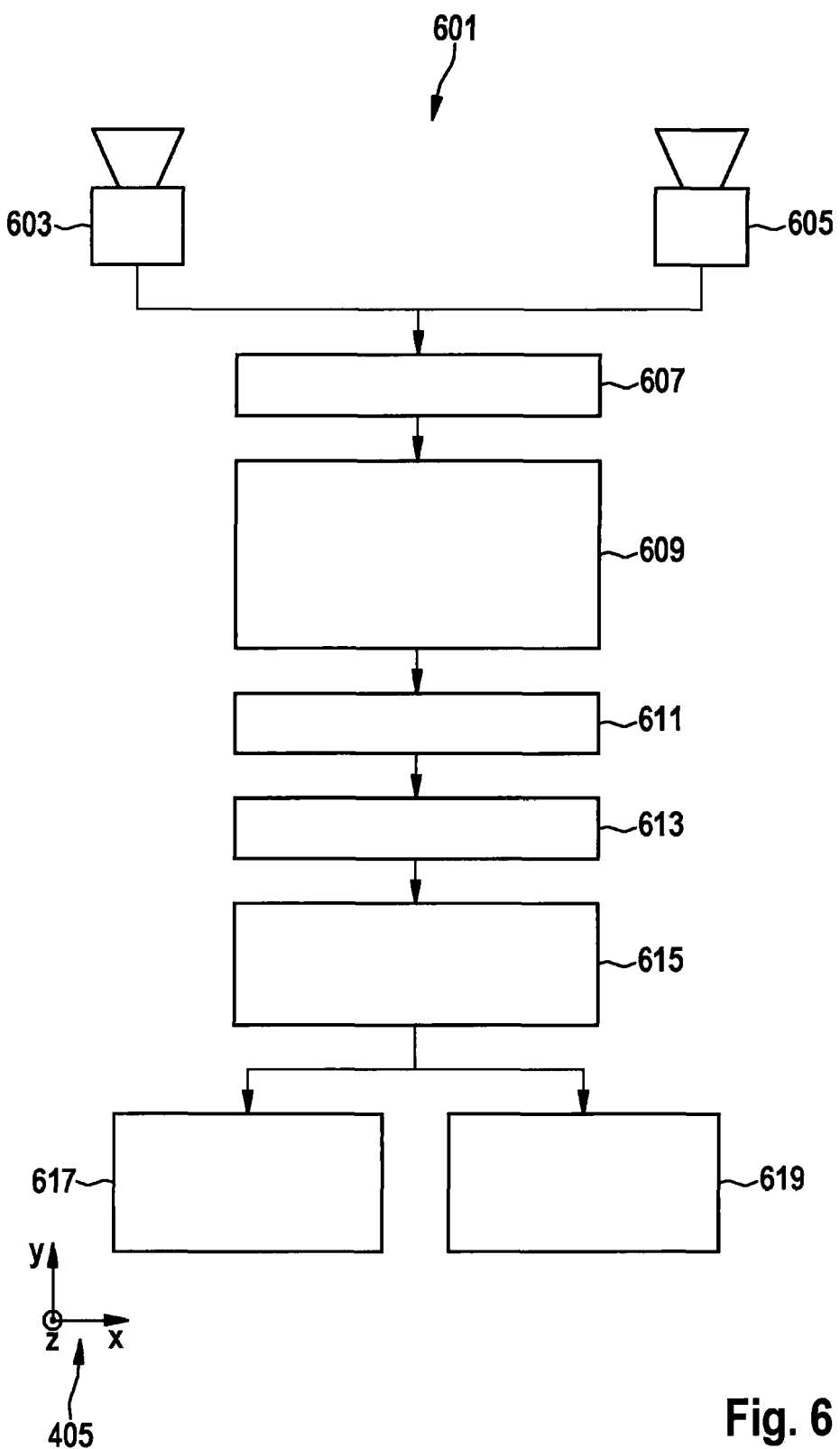
FIG. 6 is a flow chart of a further method for processing or manipulating sensor data of a stereo sensor system.

FIG. 6 is a flow chart of a further method for processing or manipulating sensor data of a stereo sensor system 601.

Stereo sensor system 601 encompasses two video cameras 603 and 605 that are disposed with a mutual horizontal offset. The corresponding sensor data of the two video cameras 603, 605, which each correspond to one sensor image, are used in a step 607 to constitute a disparity map 609. In a step 611 provision is made to smooth disparity map 609 in a vertical and/or horizontal direction in order to advantageously suppress observation noise in disparity map 609.

In a step 613, a change in disparity between two disparity points of disparity map 609 that are constituted with a spacing from one another is identified. For this, in particular, the change in disparity in the column direction of disparity map 609 is identified.

In a step 615 a classification then takes place in order to classify at least one of the disparity points. A classification can be carried out in particular in such a way that the object on which the disparity points are based is classified as an obstacle 617 or as an open area 619.

This classification in accordance with step 615 is carried out in particular as a function of the change in disparity in accordance with step 613. In particular, a threshold value is provided in this context; preferably, in the context of a change in disparity that is less than, or less than or equal to, the predetermined threshold value, the corresponding disparity points are classified as open area 619. If the change in disparity is greater than, or greater than or equal to, the predetermined threshold value, the corresponding disparity points are then classified as an obstacle 617.

In summary, the invention therefore encompasses in particular the idea of carrying out a recognition of obstacles and an identification of travelable open areas on the basis of a disparity map of a stereo sensor system, in particular of a stereo video sensor system. No assumptions as to planes in the environment of the stereo sensor system are necessary, so that the invention is also usable for a large range of distances relative to the stereo sensor system.

What is claimed is:

1. A method for processing sensor data of a stereo sensor system for stereoscopic sensing of an environment of the stereo sensor system, comprising:
   receiving, from a stereo sensor system, a first sensor image and a second sensor image;
   forming a disparity map based on a set of all disparities of the first sensor image and the second sensor image, a disparity comprising a one-dimensional displacement vector between an image point of the first sensor image and a corresponding image point of the second sensor image;
   identifying a change in disparity between two disparity points of the disparity map that are formed with a spacing from one another, wherein the change in disparity is a difference between a first disparity value of a first one of the two disparity points and a second disparity value of a second one of the two disparity points;
   comparing the change in disparity to a predetermined threshold value;
   classifying at least one of the two disparity points to correspond to an object as a function of whether the change in disparity is greater than, equal to, or less than the predetermined threshold value; and
   controlling a driver assistance system of a vehicle based on the classifying,
   wherein the classifying includes assigning the at least one of the two disparity points to one or more predetermined object classes, and wherein a sensitivity of the classifying is adjustable based on a selection of the spacing.

2. The method as recited in claim 1, further comprising selecting the spacing between the two disparity points as a function of a position of one of the two disparity points in the disparity map.

3. The method as recited in claim 1, further comprising selecting the spacing between the two disparity points as a function of a disparity noise.

4. The method as recited in claim 1, further comprising selecting the spacing to be constant for all disparity points of the disparity map.

5. The method as recited in claim 1, further comprising smoothing the disparity map in at least one of a horizontal direction and a vertical direction.

6. The method as recited in claim 1, selecting the two disparity points as two disparity points of the disparity map that are disposed with an exclusively vertical mutual offset.

7. The method as recited in claim 6, wherein in a context of a negative change in disparity, a first disparity point is classified as an object that can be traveled under if a second disparity point is above the first disparity point.

8. The method as recited in claim 1, wherein the classifying includes determining that the object is one of an obstacle, a travelable area, and an object that can be traveled under.

9. The method as recited in claim 1, wherein the classifying is done without calculating a plane of a roadway surface.

10. The method as recited in claim 1, wherein the classifying is done without calculating a row-wise histogram of the disparity map.

11. The method as recited in claim 1, wherein the classifying includes determining that the object is a travelable area when the change in disparity is greater than the predetermined threshold value.

12. The method as recited in claim 1, wherein the classifying includes determining that the object is an obstacle when the change in disparity is less than the predetermined threshold value.

13. The method as recited in claim 1, further comprising selecting the spacing differently for each of the disparity points of the disparity map.

14. An apparatus for processing sensor data of a stereo sensor system for stereoscopic sensing of an environment of the stereo sensor system, comprising:
  a disparity device for receiving a first sensor image and a second sensor image from a stereo sensor system and forming a disparity map based on a set of all disparities of the first sensor image and the second sensor image, a disparity comprising a one-dimensional displacement vector between an image point of the first sensor image and a corresponding image point of the second sensor image;
  an identification device for identifying a change in disparity between two disparity points of the disparity map that are formed with a spacing from one another, wherein the change in disparity is a difference between a first disparity value of a first one of the two disparity points and a second disparity value of a second one of the two disparity points; and
  a classification device for comparing the change in disparity to a predetermined threshold value and classifying at least one of the two disparity points to correspond to an object as a function of whether the change in disparity is greater than, equal to, or less than the predetermined threshold value,
  wherein the classifying includes assigning the at least one of the two disparity points to one or more predetermined object classes, and wherein a sensitivity of the classifying is adjustable based on a selection of the spacing,
  wherein a driver assistance system of a vehicle is controlled based on the classifying.

15. The apparatus as recited in claim 14, wherein the classifying includes determining that the object is one of an obstacle, a travelable area, and an object that can be traveled under.

16. An object recognition system, comprising:
  a stereo sensor system; and
  an apparatus for processing sensor data of a stereo sensor system for stereoscopic sensing of an environment of the stereo sensor system, the apparatus including:
    a disparity device for receiving a first sensor image and a second sensor image from the stereo sensor system and forming a disparity map based on a set of all disparities of the first sensor image and the second sensor image, a disparity comprising a one-dimensional displacement vector between an image point of the first sensor image and a corresponding image point of the second sensor image,
    an identification device for identifying a change in disparity between two disparity points of the disparity map that are formed with a spacing from one another, wherein the change in disparity is a difference between a first disparity value of a first one of the two disparity points and a second disparity value of a second one of the two disparity points, and
    a classification device for comparing the change in disparity to a predetermined threshold value and classifying at least one of the two disparity points to correspond to an object as a function of whether the change in disparity is greater than, equal to, or less than the predetermined threshold value; and
    a driver assistance system of a vehicle, wherein the driver assistance system is controlled based on the classifying,
  wherein the classifying includes assigning the at least one of the two disparity points to one or more predetermined object classes, and wherein a sensitivity of the classifying is adjustable based on a selection of the spacing.

17. The system as recited in claim 16, wherein the classifying includes determining that the object is one of an obstacle, a travelable area, and an object that can be traveled under.

* * * * *